(12) United States Patent
Spangler (10) Patent No.: US 9,957,813 B2
(45) Date of Patent: May 1, 2018

(54) GAS TURBINE ENGINE AIRFOIL PLATFORM COOLING PASSAGE AND CORE

(71) Applicant: United Technologies Corporation, Hartford, CT (US)

(72) Inventor: Brandon W. Spangler, Vernon, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 329 days.

(21) Appl. No.: 14/766,071

(22) PCT Filed: Feb. 5, 2014

(86) PCT No.: PCT/US2014/014897
§ 371 (c)(1),
(2) Date: Aug. 5, 2015

(87) PCT Pub. No.: WO2014/130244
PCT Pub. Date: Aug. 28, 2014

(65) Prior Publication Data
US 2015/0369056 A1  Dec. 24, 2015

Related U.S. Application Data

(60) Provisional application No. 61/766,440, filed on Feb. 19, 2013.

(51) Int. Cl.
*F01D 5/18* (2006.01)
*B22C 9/10* (2006.01)
(Continued)

(52) U.S. Cl.
CPC .............. *F01D 5/187* (2013.01); *B22C 7/06* (2013.01); *B22C 9/103* (2013.01); *F01D 5/284* (2013.01);
(Continued)

(58) Field of Classification Search
CPC ............ F05D 2240/81; F05D 2250/11; F05D 2230/21; F05D 2230/211; F01D 5/187;
(Continued)

(56) References Cited

U.S. PATENT DOCUMENTS 5,122,033 A  6/1992  Paul
5,382,135 A  1/1995  Green
(Continued)

FOREIGN PATENT DOCUMENTS

WO  2004 038179  5/2004
WO  2007 063128  6/2007

OTHER PUBLICATIONS

Extended European Search Report for European Application No. 14753508.2 dated Sep. 30, 2016.
(Continued)

*Primary Examiner* — Mark Laurenzi
*Assistant Examiner* — Xiaoting Hu
(74) *Attorney, Agent, or Firm* — Carlson, Gaskey & Olds, P.C.

(57) ABSTRACT

A gas turbine engine blade includes a platform arranged between a root and an airfoil. A cooling passage extends from the root through the platform to the airfoil. The cooling passage includes an inlet that splits into first and second branches that rejoin one another in a platform passage arranged in the platform. An airfoil passage extends from the platform passage and is arranged in the platform.

16 Claims, 5 Drawing Sheets

(51) Int. Cl.
*B22C 7/06* (2006.01)
*F01D 5/28* (2006.01)

(52) U.S. Cl.
CPC ...... *F05D 2220/32* (2013.01); *F05D 2230/21* (2013.01); *F05D 2230/211* (2013.01); *F05D 2240/81* (2013.01); *F05D 2250/11* (2013.01); *F05D 2250/185* (2013.01); *F05D 2260/20* (2013.01); *F05D 2300/20* (2013.01); *Y02T 50/676* (2013.01)

(58) Field of Classification Search
CPC ......... F01D 5/188; Y02T 50/676; B22C 7/06; B22C 9/10–9/108
See application file for complete search history.

(56) References Cited

U.S. PATENT DOCUMENTS

| | | | |
|---|---|---|---|
| 5,599,166 A * | 2/1997 | Deptowicz | B22C 9/04 164/369 |
| 5,813,835 A * | 9/1998 | Corsmeier | F01D 5/186 415/115 |
| 6,341,939 B1 | 1/2002 | Lee | |
| 6,641,360 B2 | 11/2003 | Beeck et al. | |
| 7,708,525 B2 | 5/2010 | Cherolis et al. | |
| 8,113,780 B2 | 2/2012 | Cherolis et al. | |
| 2005/0058545 A1 | 3/2005 | Cardenas | |
| 2006/0032604 A1* | 2/2006 | Beck | B22C 9/00 164/361 |
| 2007/0020100 A1* | 1/2007 | Beeck | F01D 5/147 416/193 A |
| 2008/0005903 A1 | 1/2008 | Trindade et al. | |
| 2008/0050244 A1 | 2/2008 | Cherolis et al. | |
| 2009/0202339 A1* | 8/2009 | Torii | F01D 5/18 415/115 |
| 2010/0034662 A1 | 2/2010 | Jendrix et al. | |
| 2011/0142639 A1* | 6/2011 | Campbell | F01D 5/081 416/95 |

OTHER PUBLICATIONS

International Preliminary Report on Patentability for PCT Application No. PCT/US2014/014897, dated Sep. 3, 2015.
International Search Report and Written Opinion for PCT application No. PCT/US2014/014897 completed May 13, 2014.

\* cited by examiner

GAS TURBINE ENGINE AIRFOIL PLATFORM COOLING PASSAGE AND CORE

BACKGROUND

This disclosure relates to a gas turbine engine. More particularly, the disclosure relates to cooling passages that may be incorporated into a gas turbine engine component, such as an airfoil, and a core used to form such cooling passages.

Gas turbine engines typically include a compressor section, a combustor section and a turbine section. During operation, air is pressurized in the compressor section and is mixed with fuel and burned in the combustor section to generate hot combustion gases. The hot combustion gases are communicated through the turbine section, which extracts energy from the hot combustion gases to power the compressor section and other gas turbine engine loads.

Many blades and vanes, blade outer air seals, turbine platforms, and other components include internal cooling passages formed using core structures constructed from ceramic, for example. Typically multiple cores are glued to one another and/or located within a die to provide a complex network of cooling passages.

Airfoil platforms are typically difficult to cool. Some airfoils have been proposed in which film cooling holes are provided in the platform of the blade. Such types of cooling holes may result in mixing losses and reduction in engine performance.

Still other designs utilize a separate platform core that is glued into a slot of a more substantial main core that extends from a root to an airfoil of the blade. This platform core must be relatively thin such that it can be packaged within the boundaries of the platform. As a result, the thin platform core is susceptible to breakage during the casting process, which reduces casting yield and increases part cost.

SUMMARY

In one exemplary embodiment, a gas turbine engine blade includes a platform arranged between a root and an airfoil. A cooling passage extends from the root through the platform to the airfoil. The cooling passage includes an inlet that splits into first and second branches that rejoin one another in a platform passage arranged in the platform. An airfoil passage extends from the platform passage and is arranged in the platform.

In a further embodiment of any of the above, the platform passage extends in a circumferential direction.

In a further embodiment of any of the above, the first and second branches and the platform passage are arranged in a triangular shape.

In a further embodiment of any of the above, the cooling passage includes a pair of inlet passages spaced in an axial direction from one another.

In a further embodiment of any of the above, the airfoil passage is arranged near a leading edge of the airfoil.

In a further embodiment of any of the above, the airfoil passage is arranged at a trailing edge of the airfoil.

In a further embodiment of any of the above, a film cooling hole fluidly connects an exterior surface of the blade and the platform passage.

In a further embodiment of any of the above, a gas turbine engine blade includes a second cooling passage, which includes a second inlet splitting into a second set of first and second branches that rejoin one another in a second platform passage arranged in the platform. A second airfoil passage extends from the second platform passage and is arranged in the platform.

In a further embodiment of any of the above, the first and second branches are arranged in a neck interconnecting the root and the platform. The neck has a neck circumferential width, and the platform has a platform circumferential width to, and a ratio of the neck circumferential between width to the platform circumferential width is between 0.75 and 0.95.

In another exemplary embodiment, a core for forming a cooling passage in a gas turbine engine blade includes an inlet passage core portion splitting into first and second branch core portions that rejoin one another in a platform passage core portion. An airfoil passage core portion extends from the platform passage core portion, the first and second branch core portions and the platform passage core portion.

In a further embodiment of any of the above, the first and second branch core portions and the platform passage core portion are arranged in a triangular shape providing an aperture.

In a further embodiment of any of the above, the core includes a pair of inlet passage core portions spaced from one another.

In a further embodiment of any of the above, the airfoil passage core portion provides a leading edge passage core portion.

In a further embodiment of any of the above, the airfoil passage core portion includes a serpentine passage core portion extending from the platform passage core portion and adjoining the leading edge passage core portion.

In a further embodiment of any of the above, the airfoil passage core portion provides a trailing edge passage core portion.

In another exemplary embodiment, a method of manufacturing a core for a gas turbine engine blade includes arranging a pin within a die, filling the die with ceramic to produce a core, and retracting the pin from the core to create an aperture having a generally triangular-shape.

In a further embodiment of any of the above, at least two cores are formed simultaneously with the same pin.

BRIEF DESCRIPTION OF THE DRAWINGS

The disclosure can be further understood by reference to the following detailed description when considered in connection with the accompanying drawings wherein.

DETAILED DESCRIPTION

Figure 1:
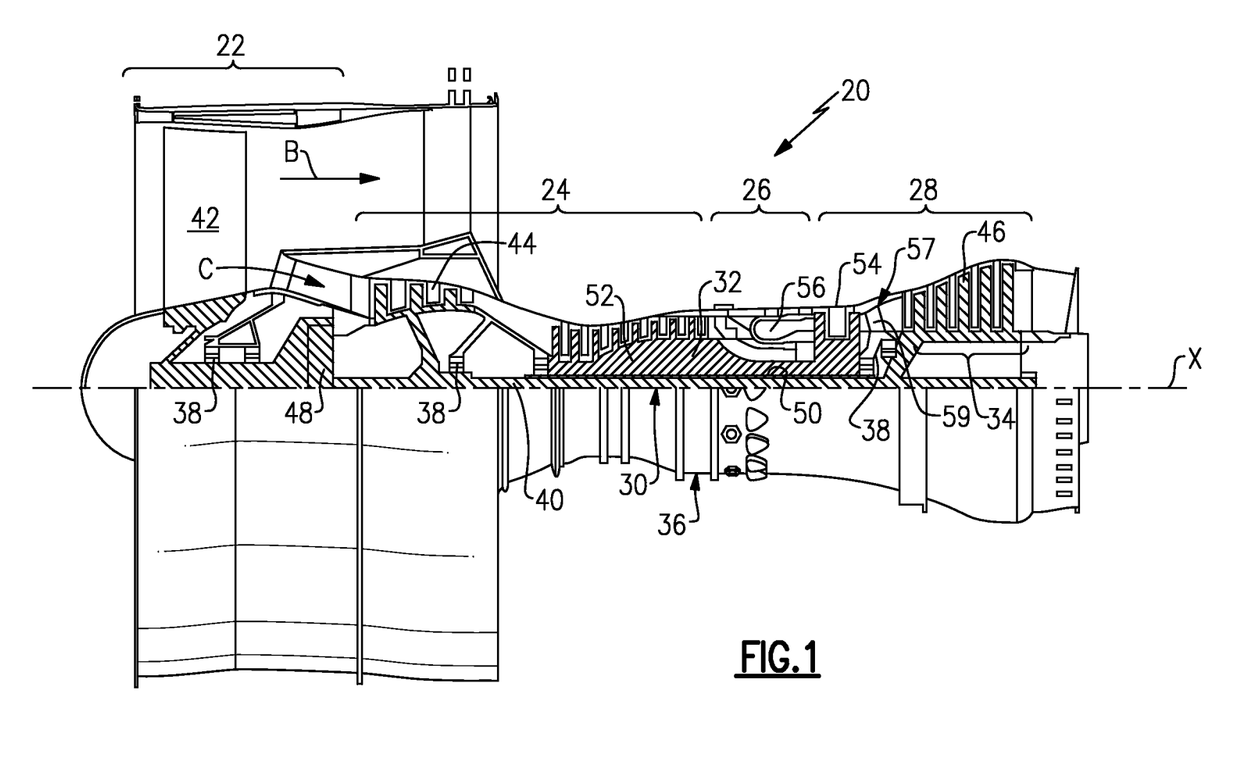
FIG. 1 schematically illustrates a gas turbine engine embodiment.

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example, a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis X relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis X.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about five (5). The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 57 of the engine static structure 36 is arranged generally between the high pressure turbine 54 and the low pressure turbine 46. The mid-turbine frame 57 further supports bearing systems 38 in the turbine section 28 as well as setting airflow entering the low pressure turbine 46.

The core airflow C is compressed by the low pressure compressor 44, then by the high pressure compressor 52, mixed with fuel, and ignited in the combustor 56 to produce high speed exhaust gases that are then expanded through the high pressure turbine 54 and low pressure turbine 46. The mid-turbine frame 57 includes vanes 59, which are in the core airflow path and function as an inlet guide vane for the low pressure turbine 46. Utilizing the vane 59 of the mid-turbine frame 57 as the inlet guide vane for low pressure turbine 46 decreases the length of the low pressure turbine 46 without increasing the axial length of the mid-turbine frame 57. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(Tram\ ^\circ R)/(518.7^\circ R)]^{0.5}$. The "Low corrected fan tip speed", as disclosed herein according to one non-limiting embodiment, is less than about 1150 ft/second.

Figure 2A:
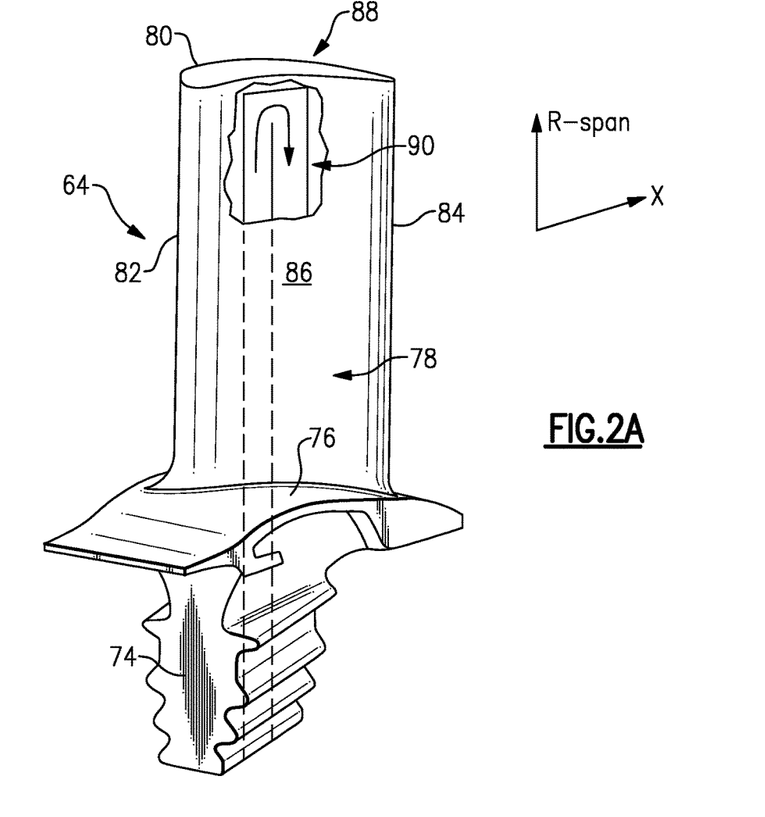
FIG. 2A is a schematic perspective view of an airfoil having the disclosed cooling passage.
Figure 2B:
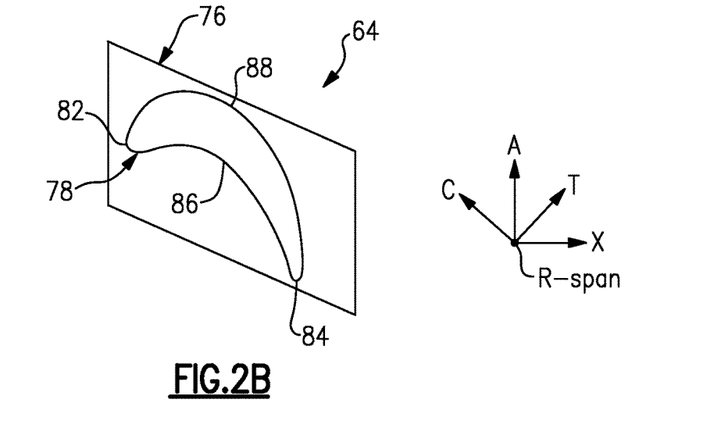
FIG. 2B is a plan view of the airfoil illustrating directional references.

Referring to FIGS. 2A and 2B, a root 74 of each turbine blade 64 is mounted to a rotor disk (not shown), as is known. The turbine blade 64 includes a platform 76, which provides the inner flow path, supported by the root 74. An airfoil 78 extends in a radial direction R from the platform 76 to a tip 80. It should be understood that the turbine blades may be integrally formed with the rotor such that the roots are eliminated. In such a configuration, the platform is provided by the outer diameter of the rotor. The airfoil 78 provides leading and trailing edges 82, 84. The tip 80 is arranged adjacent to a blade outer air seal (not shown).

The airfoil 78 of FIG. 2B somewhat schematically illustrates exterior airfoil surface extending in a chord-wise direction C from a leading edge 82 to a trailing edge 84. The airfoil 78 is provided between pressure (typically concave) and suction (typically convex) wall 86, 88 in an airfoil thickness direction T, which is generally perpendicular to the chord-wise direction C. Multiple turbine blades 64 are arranged circumferentially in a circumferential direction A. The airfoil 78 extends from the platform 76 in the radial direction R, or spanwise, to the tip 80.

The airfoil 78 includes a cooling passage 90 provided between the pressure and suction walls 86, 88. The exterior airfoil surface may include multiple film cooling holes (not shown) in fluid communication with the cooling passage 90.

The schematic cooling passage 90 illustrated in FIG. 2A is depicted in more detail in FIGS. 3A-3E. In the example, first and second cooling passages 92, 94 are provided in the blade 64. The first cooling passage 92 includes first inlets 96 that supply cooling fluid from the root 74 to a forward portion of the blade 64. Although a pair of inlets is shown, more or fewer inlets may be used.

Figure 3A:
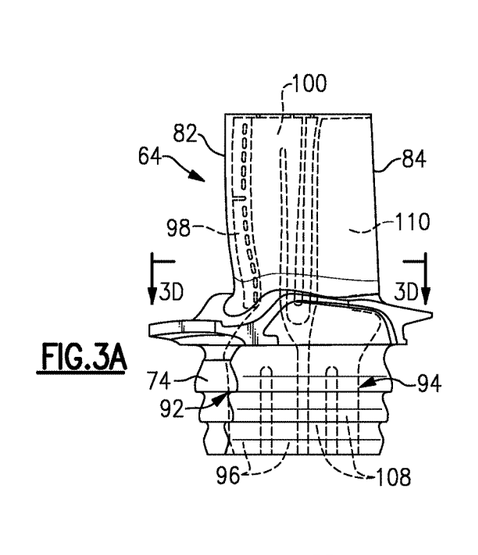
FIGS. 3A-3E illustrate various views of an example turbine blade having the disclosed cooling passages.
Figure 3B:
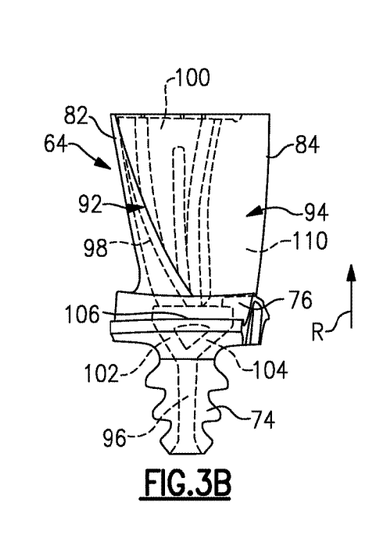
Figure 3C:
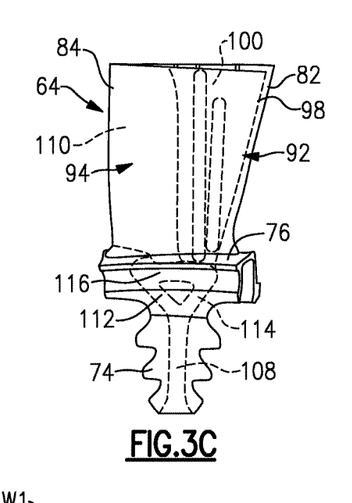
Figure 3D:
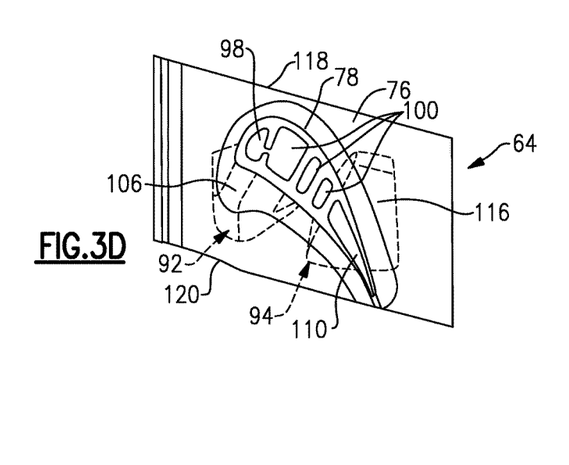

In the example, the first cooling passage 92 includes a serpentine passage 100 that has multiple legs and also supplies cooling fluid to a leading edge cooling passage 98. Referring to FIGS. 3B and 3D, the first inlets 96 feed cooling fluid to first and second leading edge branches 102, 104, splitting or diverting the flow from the first inlets 96. The first and second leading edge branches 102, 104 are joined to a first platform passage 106 that is generally parallel with the platform 76 and perpendicular to the radial direction R. The first and second leading edge branches 102, 104 and first platform passage 106 forms a generally triangular passage. "Generally triangular" includes, for example, pie-shaped arrangements.

The second cooling passage 94 includes second inlets 108 that feed cooling fluid from the root 74 to a trailing edge passage 110 providing an airfoil passage. Cooling fluid from the second inlets 108 is split by first and second trailing edge branches 112, 114. The flow from the first and second trailing edge branches 112, 114 is joined by second platform passage 116, which runs generally parallel with the platform 76 and perpendicular to the radial direction R. The first and second trailing edge branches 112, 114 and the second platform passage 116 form a generally triangular structure.

Figure 3E:
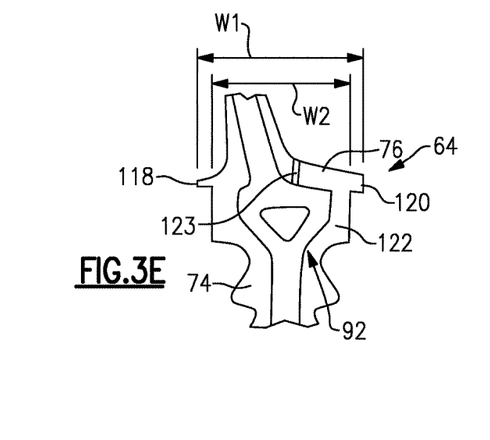

Referring to FIG. 3E, a shank or neck 122 is shown in more detail. The platform 76 includes first and second circumferential platform edges 118, 120, which are adjacent to the platforms of adjoining blades. The width of the neck 122 is wider than typical to accommodate the triangular cooling passage. A typical neck circumferential width W2 to platform circumferential width W1 provides a ratio (W2/W1) that is approximately 0.4. The embodiment ratio (W2/W1) is approximately 0.85, but can range from 0.75 to 0.95.

As shown in FIG. 3E, film cooling holes 123 may fluidly interconnect to the first and/or second cooling passages 92, 94 to provide cooling fluid to an area of the blade 64, such as an upper platform surface.

Figure 4A:
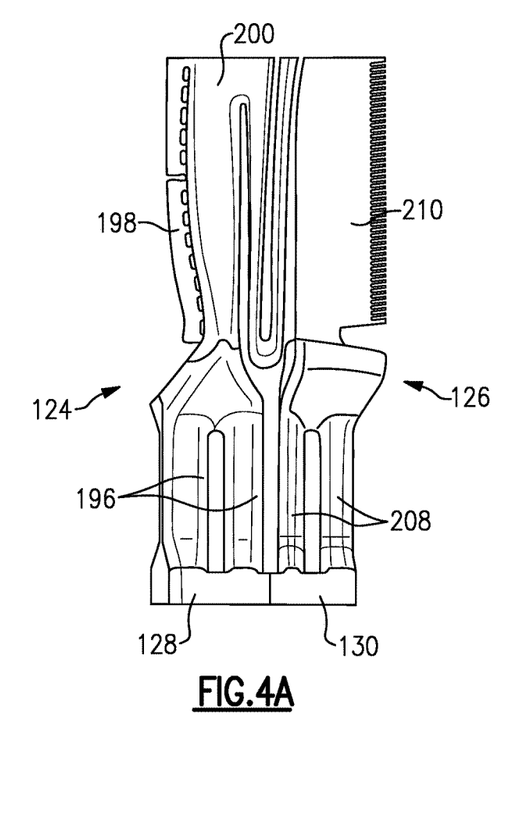
FIGS. 4A-4C illustrate various views of example cores used to form the cooling passages illustrated in FIGS. 3A-3E.
Figure 4B:
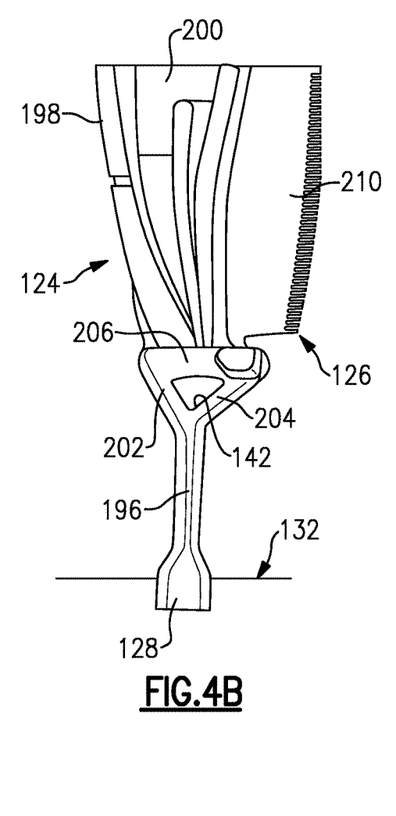
Figure 4C:
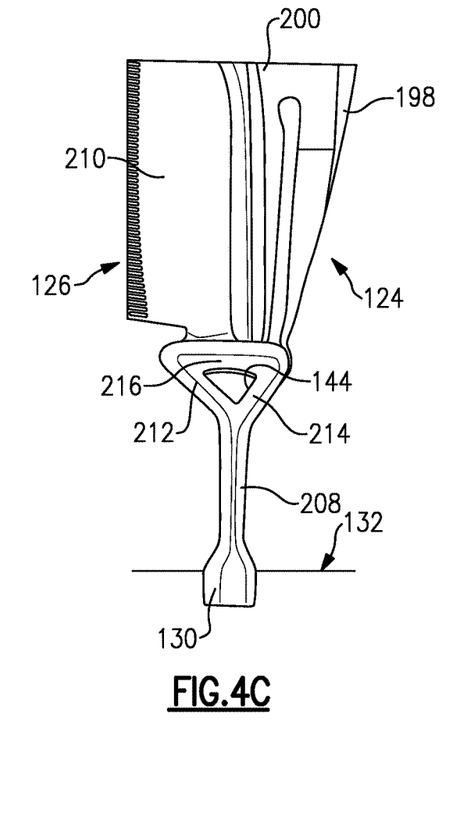

First and second cores 124, 126 are used to form the first and second cooling passages 92, 94, as shown in FIGS. 4A-4C. The first and second cores 124, 126 are each one-piece, unitary ceramic structures without any glue, in one example. However, other materials may be used, for example.

The first core 124 includes a first end 128 that interconnects the first inlet core portions 196 to one another for structural support. Similarly, the second core 126 includes a second end 130 that interconnects the second inlet core portions 208.

The first core 124 includes first inlet core portions 196 that are configured to supply cooling fluid from the root 74 to a forward portion of the blade 64. In the example, the first core 124 includes a serpentine passage core portion 200 that includes multiple legs and is connected to a leading edge cooling passage core portion 198. The first inlet core portion 196 is connected to first and second leading edge branch core portions 202, 204, splitting in a "Y" from the first inlet core portion 196. The first and second leading edge branch core portions 202, 204 are joined to a first platform passage core portion 206 that is generally perpendicular to the first inlet core portion 196. The first and second leading edge branch core portions 202, 204 and first platform passage core portion 206 forms a generally triangular shape and stiff core structure.

The second core 126 includes second inlet core portions 208 that are configured to supply cooling fluid from the root 74 to an aft portion of the blade 64. In the example, the second core 126 includes a trailing edge cooling passage core portion 210. The second inlet core portion 208 is connected to first and second trailing edge branches core portion 212, 214, splitting in a "Y" from the second inlet core portion 208. The first and second trailing edge branch core portions 212, 214 are joined to a second platform passage core portion 216 that is generally perpendicular to the second inlet core portion 208. The first and second leading edge branch core portions 212, 214 and second platform passage core portion 216 forms a generally triangular shape.

Figure 5:
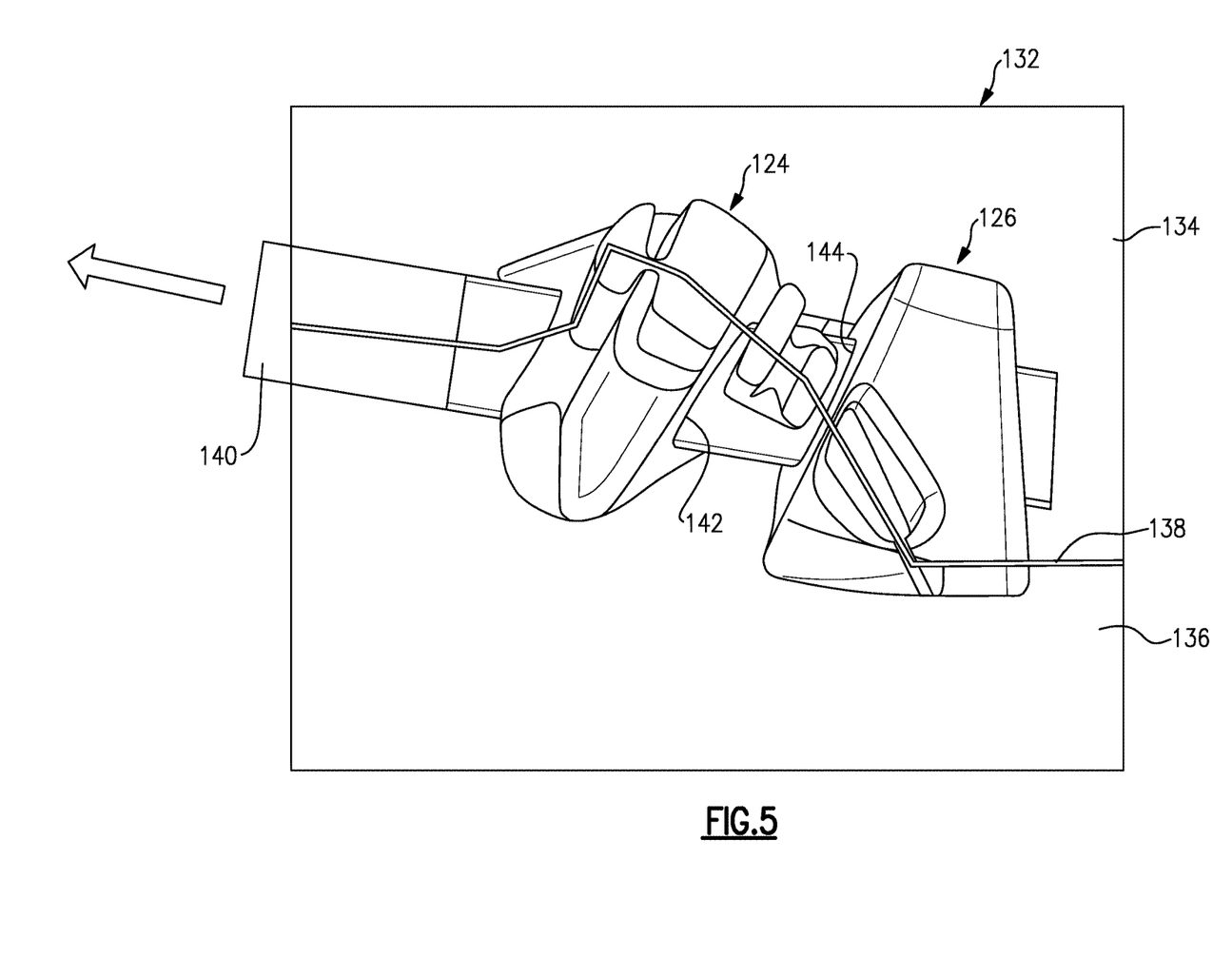
FIG. 5 schematically depicts a casting process using the cores shown in FIGS. 4A-4C.

Referring to FIG. 5, the core die 132 includes first and second die portions 134, 136 that are split along parting line 138. A pin 140 is inserted into the core die 132. Ceramic is injected into the cavities of core die 132, encasing the pin 140. After the ceramic injection process, the pin 140 is retracted, creating apertures 142, 144 in the ceramic cores 124, 126. The core die portions 134, 136 are separated and the cores 124, 126 removed. During the casting process, molten metal fills the apertures 142, 144 to create flow diverters that split the fluid flow into branches.

Although example embodiments have been disclosed, a worker of ordinary skill in this art would recognize that certain modifications would come within the scope of the claims. For that and other reasons, the following claims should be studied to determine their true scope and content.

What is claimed is:

1. A gas turbine engine blade comprising:
a platform arranged between a root and an airfoil, a cooling passage extending from the root through the platform to the airfoil, the cooling passage including an inlet splitting into first and second branches that rejoin one another in a platform passage arranged in the platform, and an airfoil passage extending from the platform passage and arranged in the platform.

2. The gas turbine engine blade according to claim 1, wherein the platform passage extends in a circumferential direction.

3. The gas turbine engine blade according to claim 1, wherein the first and second branches and the platform passage are arranged in a triangular shape.

4. The gas turbine engine blade according to claim 1, wherein the cooling passage includes a pair of inlet passages spaced in an axial direction from one another.

5. The gas turbine engine blade according to claim 1, wherein the airfoil passage is arranged near a leading edge of the airfoil.

6. The gas turbine engine blade according to claim 1, wherein the airfoil passage is arranged at a trailing edge of the airfoil.

7. The gas turbine engine blade according to claim 1, comprising a film cooling hole fluidly connecting an exterior surface of the blade and the platform passage.

8. The gas turbine engine blade according to claim 1, comprising a second cooling passage including a second inlet splitting into a second set of first and second branches that rejoin one another in a second platform passage arranged in the platform, and a second airfoil passage extending from the second platform passage and arranged in the platform.

9. The gas turbine engine blade according to claim 1, wherein the first and second branches are arranged in a neck interconnecting the root and the platform, the neck having a neck circumferential width, the platform having a platform circumferential width, and a ratio of the neck circumferential width to the platform circumferential width is between 0.75 and 0.95.

10. A core for forming a cooling passage in a gas turbine engine blade, comprising:

an inlet passage core portion splitting into first and second branch core portions that rejoin one another in a platform passage core portion, and an airfoil passage core portion extending from the platform passage core portion, the first and second branch core portions and the platform passage core portion are arranged in a triangular shape providing an aperture.

11. The core according to claim 10, wherein the core includes a pair of inlet passage core portions spaced from one another.

12. The core according to claim 10, wherein the airfoil passage core portion provides a leading edge passage core portion.

13. The core according to claim 12, wherein the airfoil passage core portion includes a serpentine passage core portion extending from the platform passage core portion and adjoining the leading edge passage core portion.

14. The core according to claim 10, wherein the airfoil passage core portion provides a trailing edge passage core portion.

15. A method of manufacturing the core according to claim 10, comprising:

arranging a pin within a die;

filling the die with ceramic to produce the core; and retracting the pin from the core to create the aperture having the triangular-shape.

16. The method according to claim 15, wherein at least two cores are formed simultaneously with the same pin.

\* \* \* \* \*